(12) United States Patent
Westfall

(10) Patent No.: US 10,486,502 B2
(45) Date of Patent: Nov. 26, 2019

(54) APPARATUS AND METHOD FOR SHIELDING AN OCCUPANT FROM SUNLIGHT PASSING THROUGH SIDE WINDOWS OF A MOTOR VEHICLE

(71) Applicant: FORD GLOBAL TECHNOLOGIES, LLC, Dearborn, MI (US)

(72) Inventor: Christopher Robert Westfall, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 15/900,948

(22) Filed: Feb. 21, 2018

(65) Prior Publication Data

US 2019/0255918 A1  Aug. 22, 2019

(51) Int. Cl.
*B60J 1/08* (2006.01)
*B60J 1/20* (2006.01)

(52) U.S. Cl.
CPC ........... *B60J 1/2052* (2013.01); *B60J 1/2044* (2013.01); *B60J 1/2047* (2013.01)

(58) Field of Classification Search
CPC ....... B60J 1/2052; B60J 1/2044; B60J 1/2047
See application file for complete search history.

(56) References Cited

U.S. PATENT DOCUMENTS

| | | | | |
|---|---|---|---|---|
| 2,559,471 | A | | 7/1951 | Schrock |
| 4,874,026 | A | * | 10/1989 | Worrall ................. B60J 1/2025 160/23.1 |
| 5,000,506 | A | * | 3/1991 | Abu-Shumays ....... B60J 3/0208 296/97.4 |
| 5,040,839 | A | | 8/1991 | Moore |
| 5,192,110 | A | * | 3/1993 | Mykytiuk ................. B60J 3/02 160/370.21 |
| 5,409,284 | A | | 4/1995 | Mahler |
| 6,206,451 | B1 | * | 3/2001 | Maano ..................... B60J 11/00 296/136.04 |
| 6,227,601 | B1 | * | 5/2001 | LaFrance ............... B60J 1/2011 296/97.11 |
| 7,156,444 | B1 | * | 1/2007 | Da Silva .................. B60J 11/08 296/142 |
| 8,162,376 | B1 | | 4/2012 | Grossmith |
| 2004/0040672 | A1 | * | 3/2004 | Nagar .................... B60J 1/2025 160/98 |

(Continued)

FOREIGN PATENT DOCUMENTS

WO     2014040201 A1     3/2014

OTHER PUBLICATIONS

English Machine Translation of WO2014040201A1.

*Primary Examiner* — Lori L Lyjak
(74) *Attorney, Agent, or Firm* — Vichit Chea; King & Schickli, PLLC

(57) ABSTRACT

An apparatus for shielding an occupant of a motor vehicle from sunlight passing through the side windows of the motor vehicle includes a guideway and a shade. The guideway includes a first open lateral end and a second open lateral end. The shade is displaceable along the guideway between a first use position projecting from the first open lateral end, a second use position projecting form the second open lateral end and an intermediate stowed position. A method of shielding an occupant of a motor vehicle from sunlight passing through a first side window and a second side window is also described.

15 Claims, 10 Drawing Sheets

(56) References Cited

U.S. PATENT DOCUMENTS

| | | | |
|---|---|---|---|
| 2006/0082192 A1* | 4/2006 | Dubay | B60J 1/2011 |
| | | | 296/214 |
| 2007/0187977 A1* | 8/2007 | Mollick | B60J 1/2025 |
| | | | 296/97.8 |
| 2009/0174217 A1 | 7/2009 | Lawall et al. | |
| 2009/0273209 A1* | 11/2009 | Joab | B60J 1/1884 |
| | | | 296/215 |
| 2011/0062741 A1 | 3/2011 | Xhunga | |
| 2013/0038093 A1* | 2/2013 | Snider | B60J 7/0015 |
| | | | 296/219 |

* cited by examiner

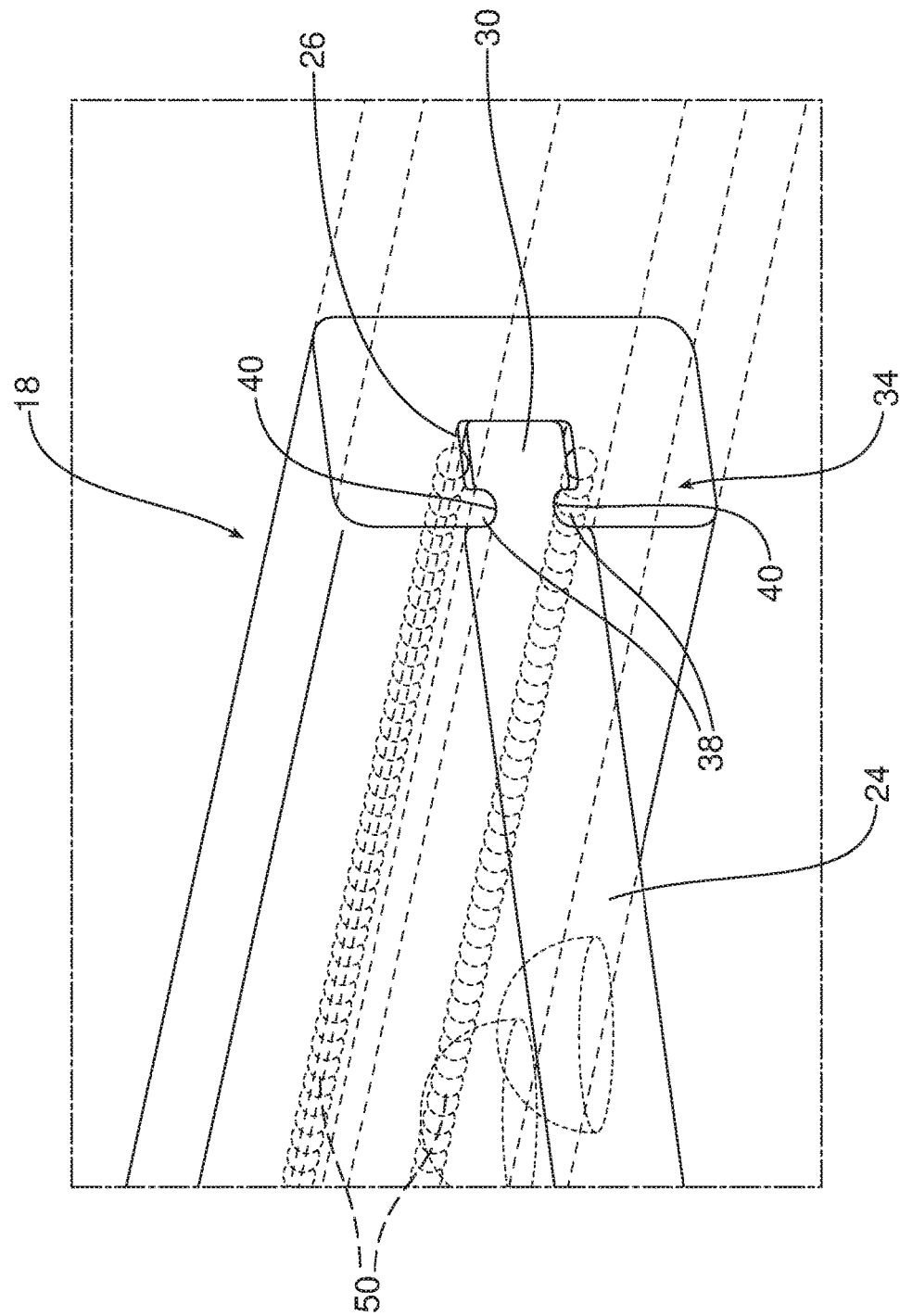

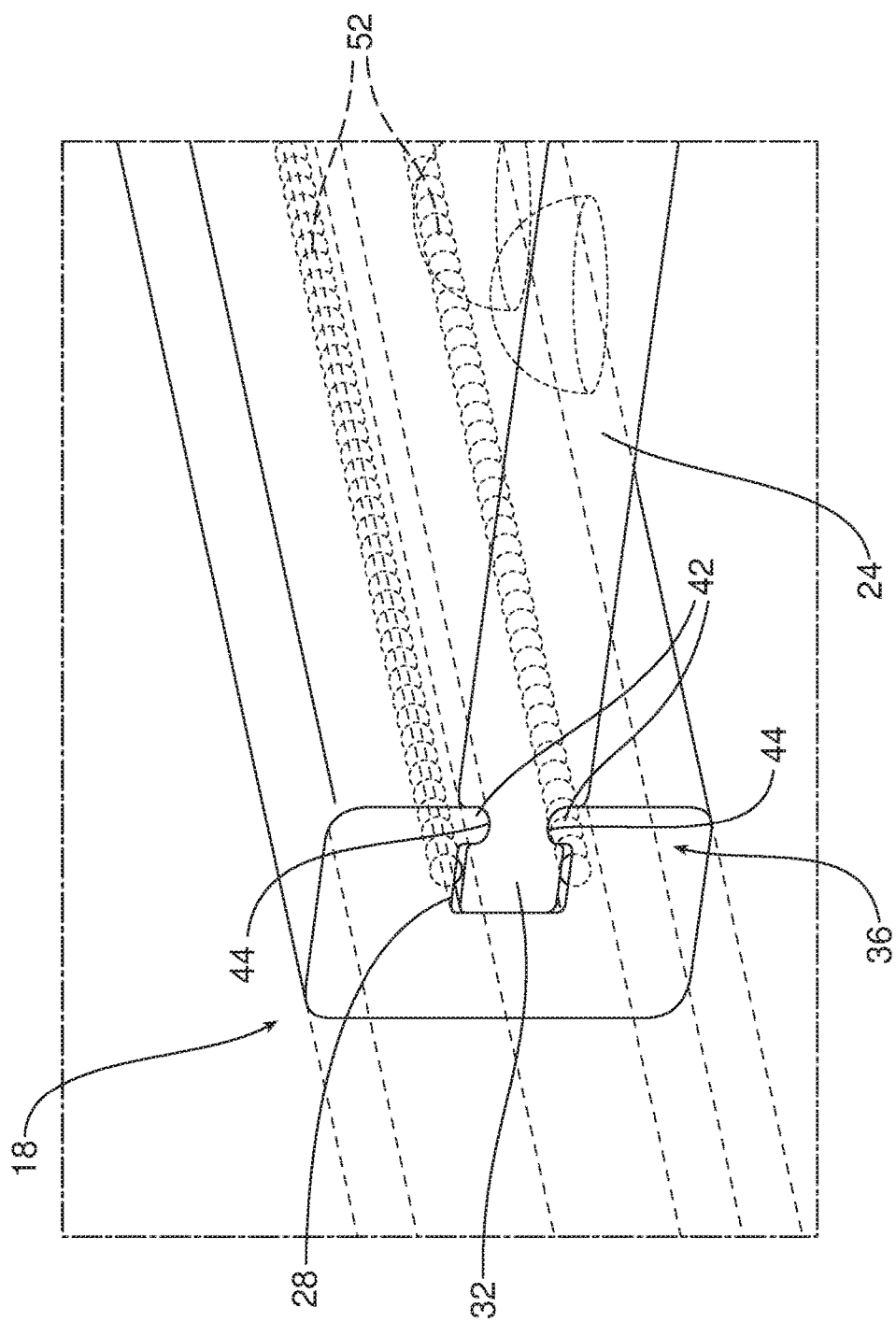

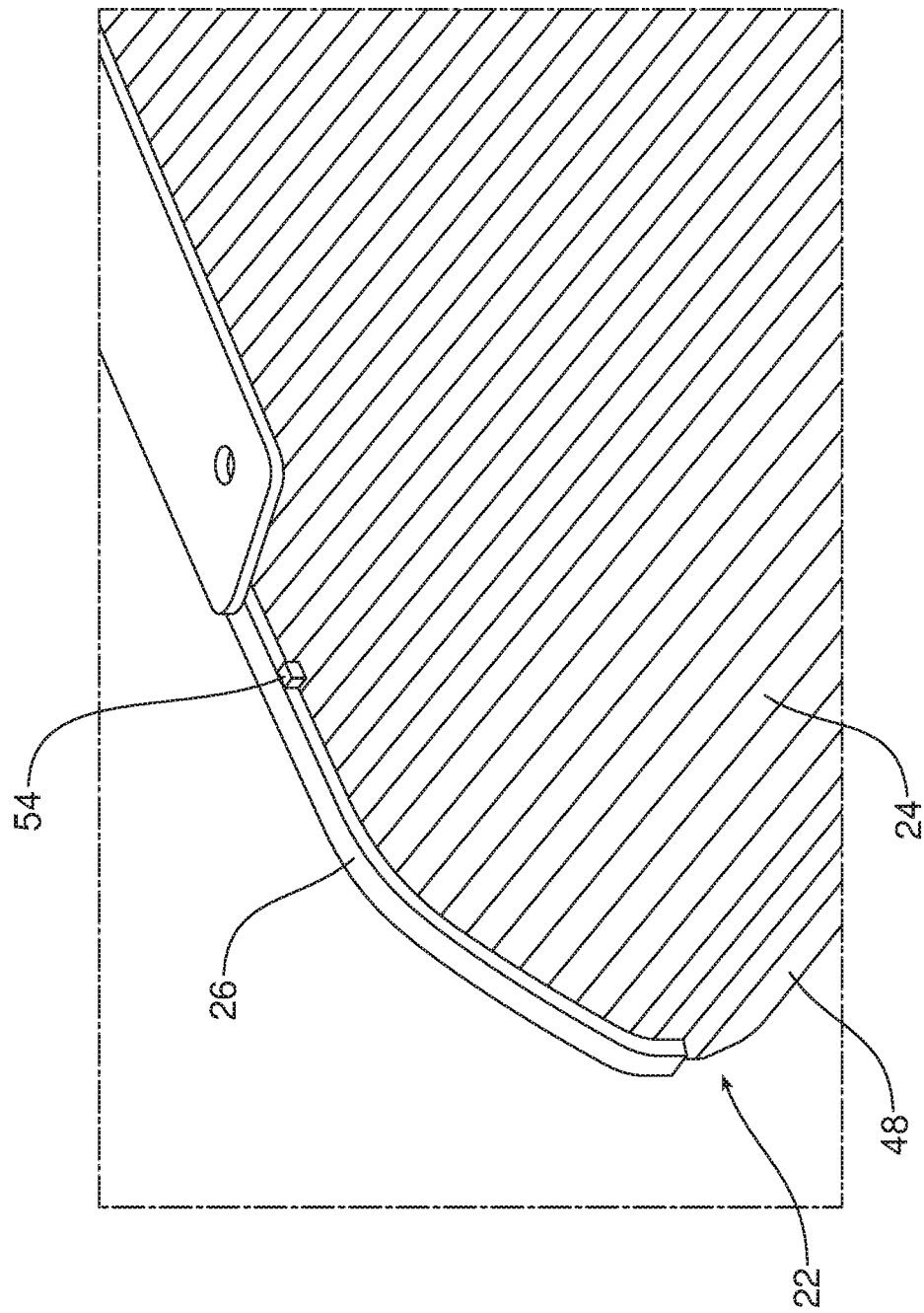

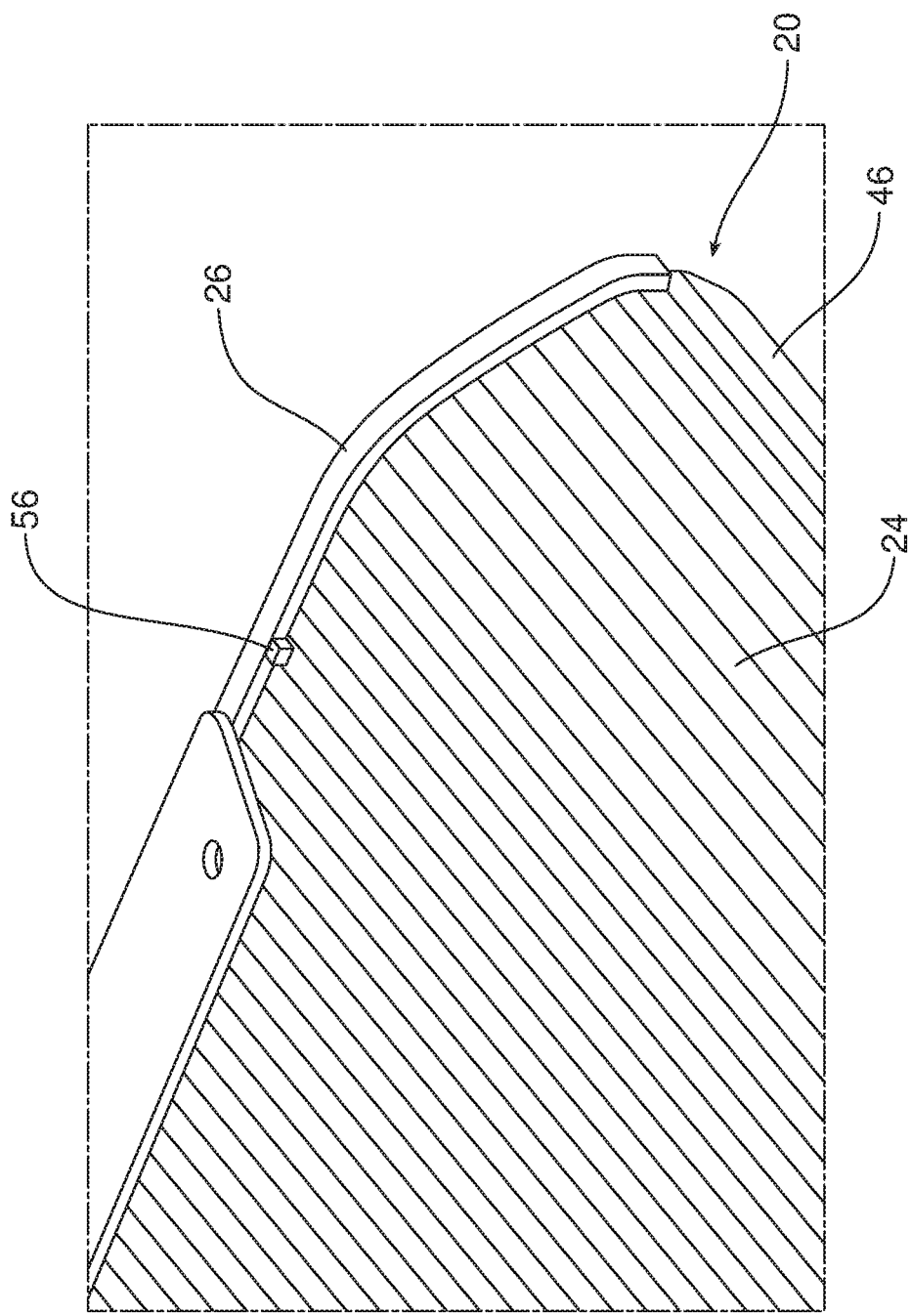

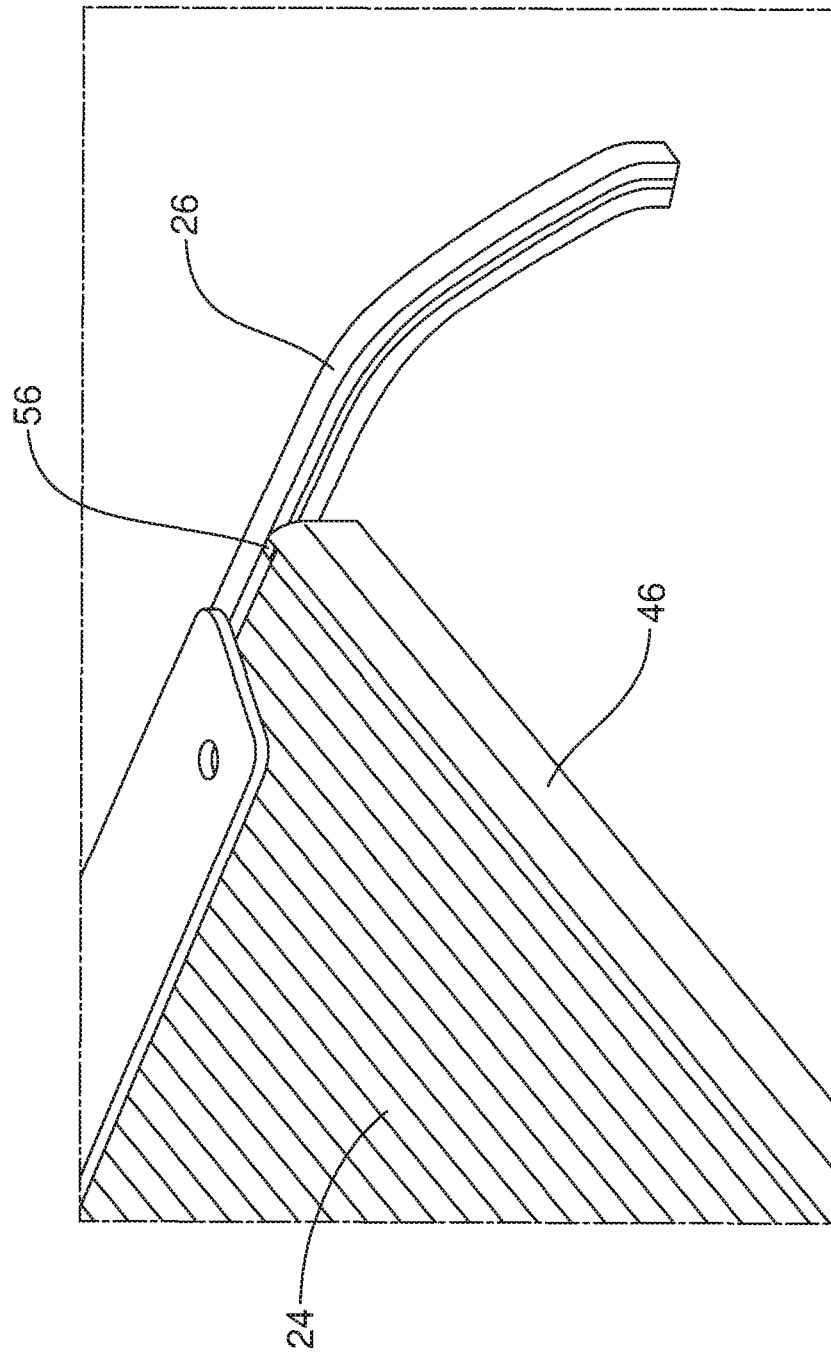

APPARATUS AND METHOD FOR SHIELDING AN OCCUPANT FROM SUNLIGHT PASSING THROUGH SIDE WINDOWS OF A MOTOR VEHICLE

TECHNICAL FIELD

This document relates generally to an apparatus and related method for efficiently and effectively shielding an occupant from sunlight passing through the side windows of a motor vehicle.

BACKGROUND

When the sun is low in the sky, the sunlight may pass through the side windows of a motor vehicle adversely affecting the vision of the occupants and in some instances causing uncomfortable heating of the occupants. This document relates to a new and improved apparatus and method for efficiently and effectively shielding an occupant from sunlight passing through a side window of a motor vehicle.

SUMMARY

In accordance with the purposes and benefits described herein, a new and improved apparatus is provided for shielding an occupant of a motor vehicle from sunlight passing through the side windows of the motor vehicle. That apparatus comprises a guideway including a first open lateral end and a second open lateral end. Further, the apparatus includes a single shade displaceable along the guideway between: (a) a first use position projecting from the first opened end blocking any sunlight coming in a first side window, (b) a second use position projecting from the second opened end blocking any sunlight coming in a second side window and (c) an intermediate, stowed position.

The guideway may include a first guide track and a second guide track. The shade may include a first margin engaged in the first guide track and a second margin engaged in the second guide track.

In addition, the apparatus may include a first bearing assembly in the first guide track and a second bearing assembly in the second guide track to allow for smooth sliding movement of the shade through the guide tracks as the shade is displaced between the first use position, the second use position and the intermediate, stowed position.

In addition, the apparatus may include a first retention feature capturing or retaining the first margin in the first guide track as well as a second retention feature capturing or retaining the second margin in the second guide track. The first retention feature may include first opposed ribs on the first guide track received in first opposed receivers on the first margin of the shade. The second retention feature may include second opposed ribs on the second guide track received in second opposed receivers in the second margin of the shade.

A first fingerhold may be provided at a first side end of the shade. A second fingerhold may be provided at a second side end of the shade. In addition, the apparatus may include a first stop carried on the first guide track adjacent the second opened end. The apparatus may include a second stop carried on the first guide track adjacent the first open end.

In accordance with an additional aspect, a method is provided of shielding an occupant of a motor vehicle from sunlight passing through a first side window and a second side window. That method comprises the steps of displacing a shade along a guideway in a first direction to at least partially cover the first side window and displacing the shade in a second direction along the guideway to at least partially cover the second side window. Further, the method may include the step of stowing the shade along the guideway between the first side window and the second side window.

In accordance with yet another aspect, a method of shielding an occupant of a motor vehicle from sunlight passing through a first side window and a second side window includes the step of providing a single shade that may be deployed, such as by sliding, (a) in a first direction to at least partially cover the first side window and (b) in a second direction to at least partially cover the second side window. The first and second side windows may be opposed windows. Thus, the first direction and the second direction may be opposites.

In the following description, there are shown and described several preferred embodiments of the apparatus and the related method of shielding an occupant from sunlight passing through the side windows of the motor vehicle. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method for shielding an occupant from sunlight passing through side windows of a motor vehicle and together with the description serve to explain certain principles thereof.

FIG. 5a is a detailed perspective view illustrating the first guide track of the guideway along which the shade may be displaced between the first use position, the second use position and the intermediate stowed position.

FIG. 5b is a detailed perspective view illustrating the second guide track of the guideway along which the shade may be displaced between the first use position, the second use position and the intermediate, stowed position.

FIG. 6a is a detailed perspective view illustrating a first stop adjacent the second open lateral end that limits the sliding movement of the shade along the guideway and establishes the first use positions.

FIG. 7a is a detailed perspective view illustrating a second stop adjacent the first open lateral end that limits the sliding movement of the shade along the guideway and establishes the second use position.

FIG. 7b illustrates how the fingerhold or handle at the first open end of the shade engages the first stop when the shade is fully deployed into the second use position.

Figure 1:
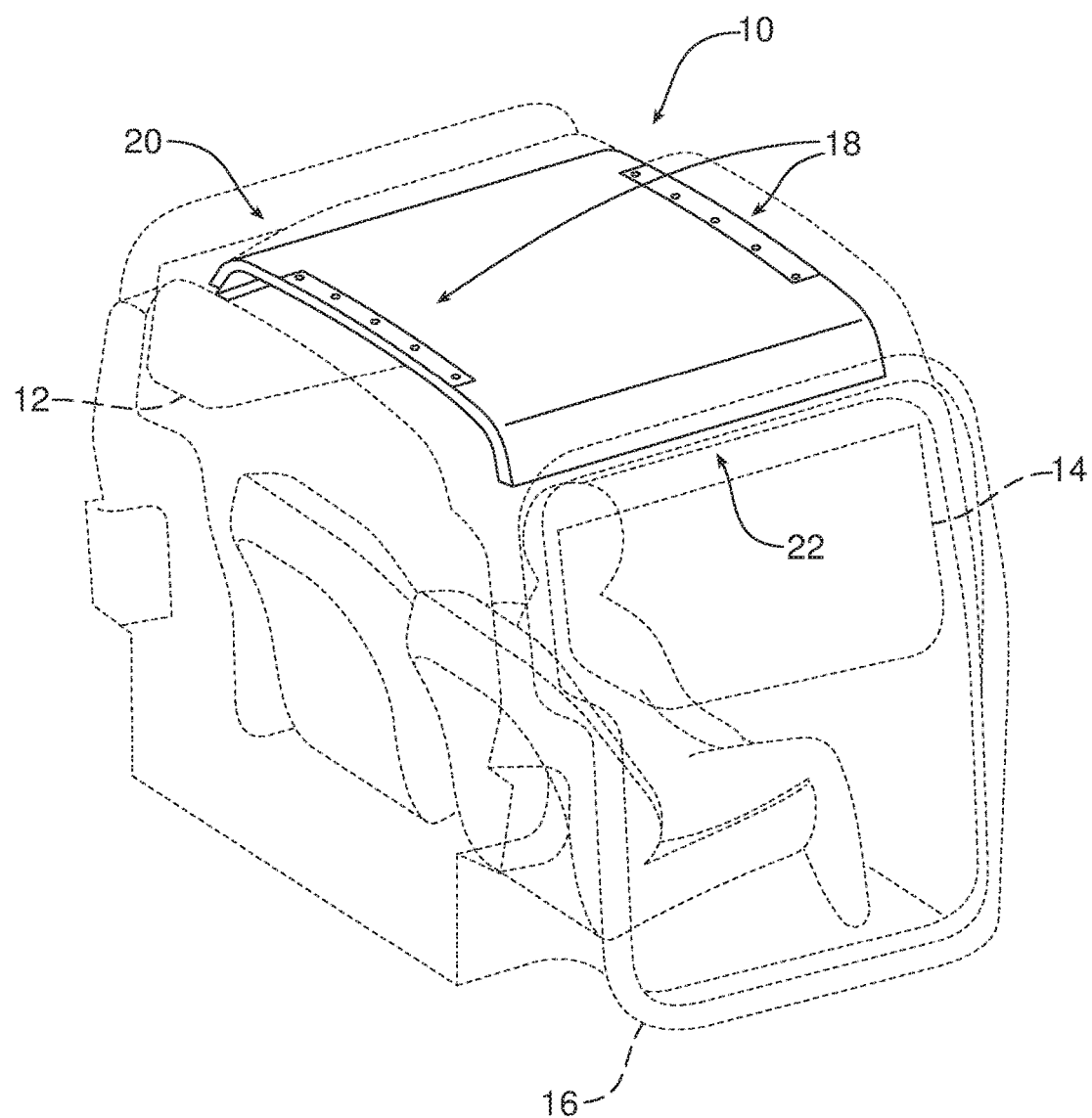
FIG. 1 is a schematic perspective view of the apparatus wherein the shade of the apparatus is in the intermediate stowed position.

Reference will now be made in detail to the present preferred embodiments of the apparatus, examples of which are illustrated in the accompanying drawing figures.

DETAILED DESCRIPTION

Reference is now made to the drawing figures which fully illustrate the new and improved apparatus 10 that is particularly adapted for shielding an occupant from sunlight passing through the side windows 12, 14 of a motor vehicle 16.

More particularly, the apparatus 10 includes a guideway 18 including a first open lateral end 20 adjacent the first side window 12 and a second open lateral end 22 adjacent the second side window 14. A shade 24 is displaceable along the guideway 18 between a first use position projecting from the first lateral end 20 and partially covering the first side window 12 (see FIG. 2), a second use position projecting from the second open lateral end 22 and partially covering the top of the second side window 14 (see FIG. 3) and an intermediate, stowed position wherein the side windows are uncovered (see FIGS. 1 and 4).

As illustrated in detail in FIGS. 5a and 5b, the guideway 18 includes a first guide track 26 and a second guide track 28. The first guide track 26 and the second guide track 28 are opposed. See, for example, FIGS. 4, 5a and 5b. More particularly, as best illustrated in FIG. 5a, the shade 24 includes a first margin 30 that is engaged in the first guide track 26. Further, as best illustrated in FIG. 5b, the shade 24 includes a second margin 32 that is engaged in the second guide track.

As best illustrated in FIG. 5a, a first retention feature retains the first margin 30 in the first guide track 26. As best illustrated in FIG. 5b, a second retention feature 36 retains the second margin 32 in the second guide track 28. More specifically, the first retention feature 34 includes first opposed ribs 38 on the first guide track 26 that are received and slide in first opposed receivers 40 (e.g. channels) on the first margin 30 of the shade 24. Similarly, the second retention feature 36 includes second opposed ribs 42 on the second guide track 28 that are received in and slide along second opposed receivers 44 (e.g. channels) on the second margin 32 of the shade 24.

Figure 2:
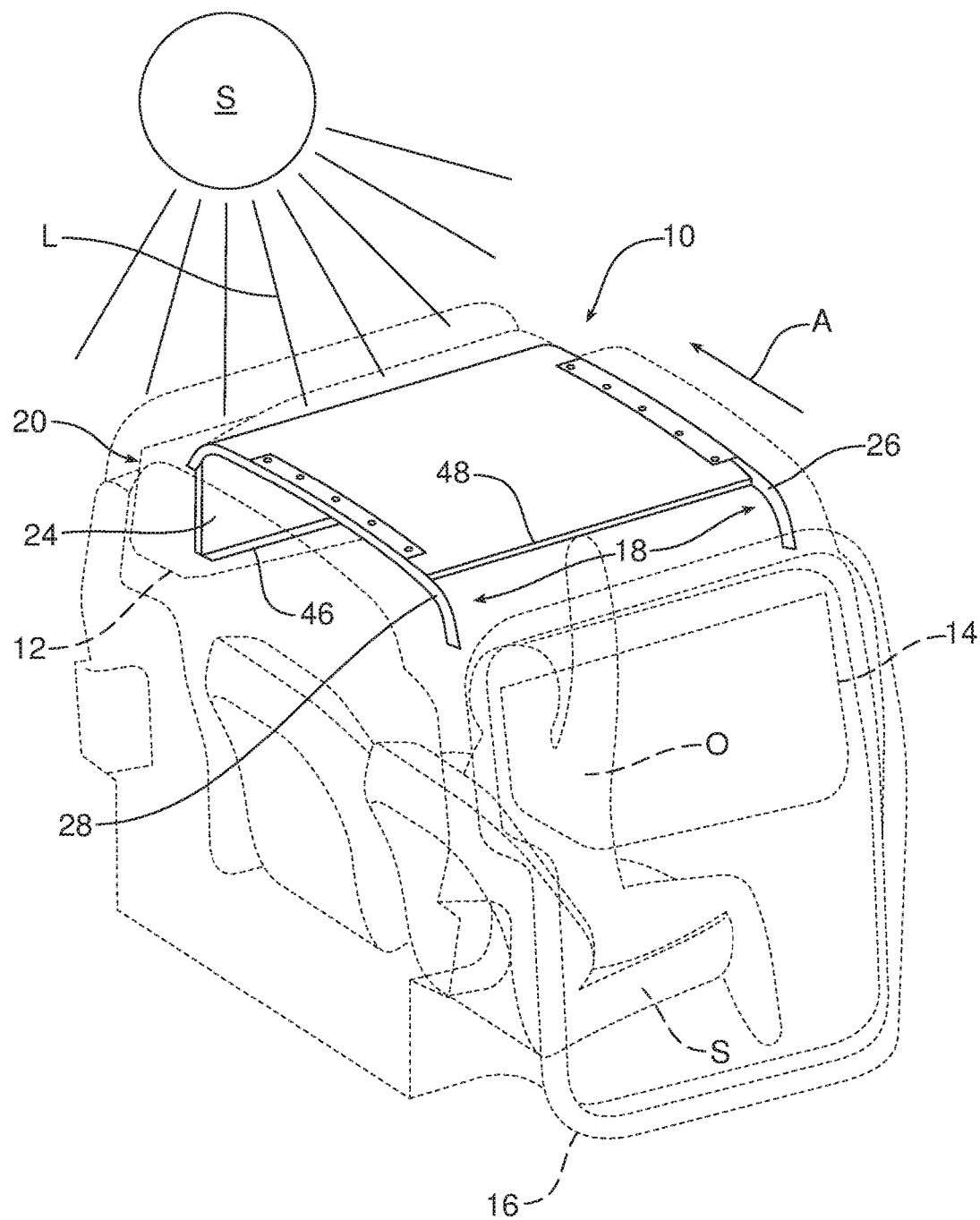
FIG. 2 is a similar view to FIG. 1 but illustrating the shade in a first use position partially covering a first side window of the motor vehicle in order to block sunlight passing through that side window.
Figure 3:
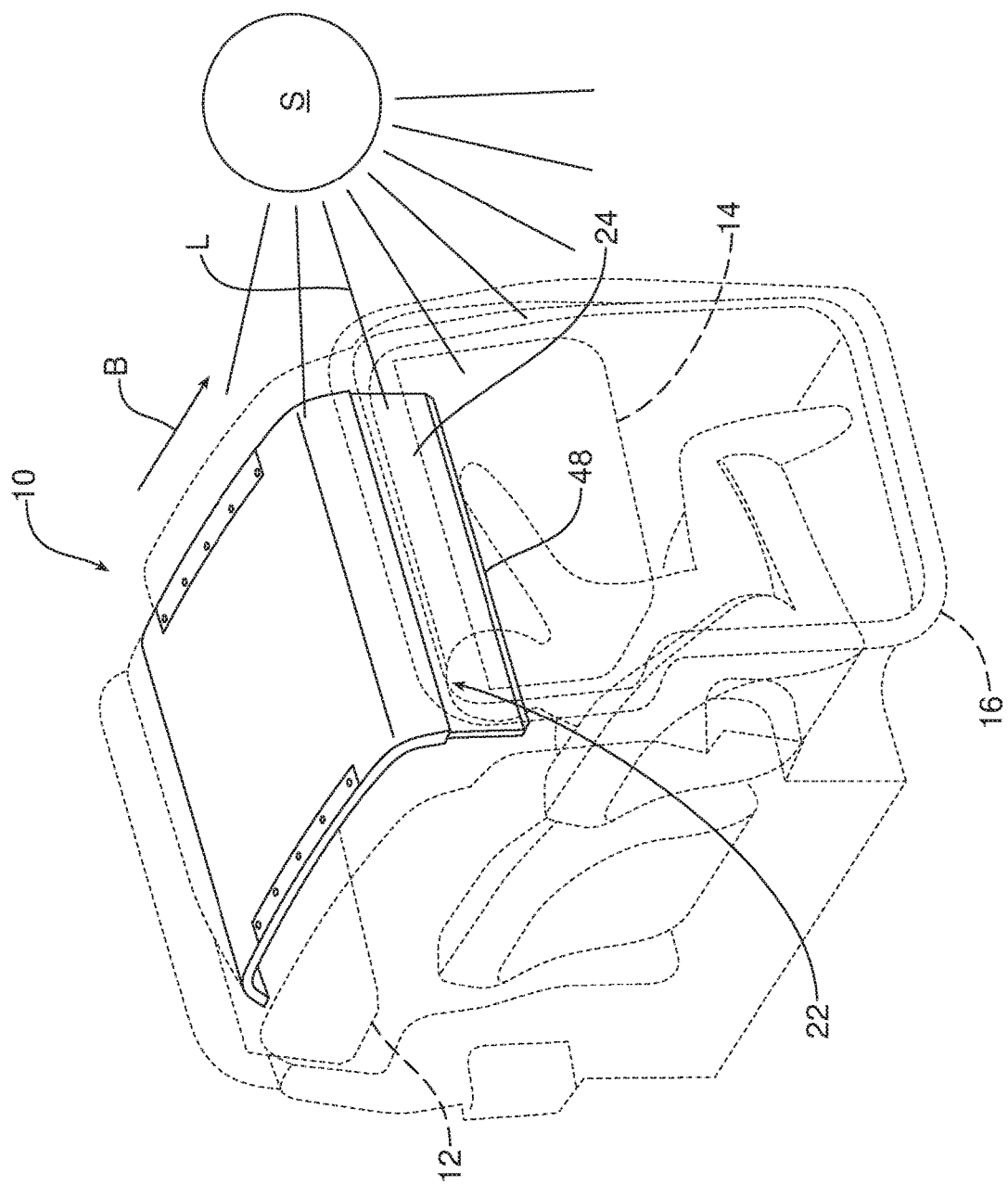
FIG. 3 is a view similar to FIGS. 1 and 2 but illustrating the shade in a second use position partially covering a second side window of the motor vehicle in order to block sunlight passing through that side window.

A first handle or fingerhold 46 is provided at a first side end of the shade 24 while a second handle or fingerhold 48 is provided at a second side end of the shade. One may engage either fingerhold 46, 48 to displace the shade between the intermediate, stowed position illustrated in FIG. 1, the first use position illustrated in FIG. 2 and the second use position illustrated in FIG. 3. For example, as illustrated in FIG. 2, the occupant O in the seat S engages the second fingerhold 48 and displaces the shade 24 in the direction of action arrow A into the first use position so that the shade projects from the first open lateral end 20 of the guideway 18 and partially covers the first side window 12. In contrast, as illustrated in FIG. 3, the occupant O has engaged the second fingerhold 48 and displaced the shade in the direction of action arrow B into the second use position so that the shade projects partially from the second open lateral end 22 of the guideway 18 and partially covers the second side window 14. In both instances, the occupant O did this in order to be shielded from the sunlight L produced by the sun S when it is low in the sky. Here the single shade 24 may be positioned to shield the sunlight L through either of the opposed side windows 12, 14 depending upon the position of the sun S as the motor vehicle 16 travels from a first point to a second point.

As further illustrated in FIG. 5a, the first guide track 26 includes a first bearing assembly 50. As illustrated in FIG. 5b, the second guide track 28 includes a second bearing assembly 52. The first bearing assembly 50 supports the first margin 30 of the shade 24 in the first guide track 26 while the second bearing assembly 52 supports the second margin 32 of the shade in the second guide track 28. Together, the first bearing assembly 50 and the second bearing assembly 52 allow for smooth sliding action of the shade 24 as it is displaced along the guideway 18 between the intermediate, stowed position illustrated in FIG. 1, the first use position illustrated in FIG. 2 and the second use position illustrated in FIG. 3.

Figure 6B:
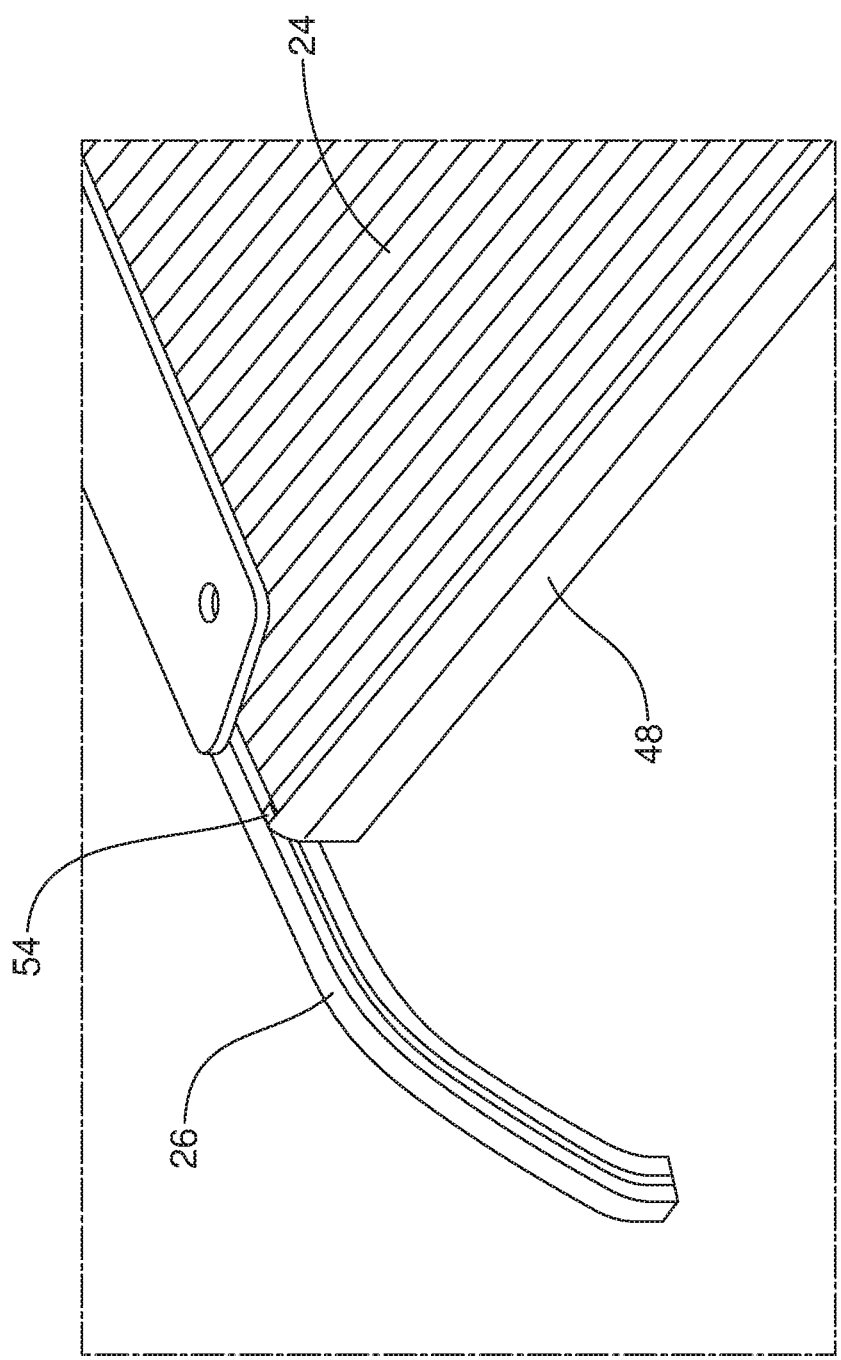
FIG. 6b illustrates how the fingerhold or handle at the second end of the shade engages the first stop when the shade is fully deployed into the first use position.

As best illustrated in FIG. 6a, a first stop 54 may be carried on the first guide track 26 adjacent the second open lateral end 22. As illustrated in FIG. 6b, the first stop 54 functions to limit the free sliding movement of the shade through the guideway 18. More particularly, the second handle or fingerhold 48 engages the first stop 54 when the shade 24 has been fully deployed into the first use position.

Similarly, as illustrated in FIGS. 7a and 7b, a second stop 56 is carried on the first guide track 26 adjacent the first open lateral end 20. The second stop 56 establishes a displacement limit for the shade 24 in the second, opposite direction. Thus, as illustrated in FIG. 7b, the first handle or fingerhold 46 engages the second stop 56 when the shade 24 has been fully deployed into the second use position partially covering the second side window 14. While not illustrated, it should be appreciated that a third stop, similar to the first stop may be carried on the second guide track 28 adjacent the second open lateral end 22. Similarly, a fourth stop may be carried on the second guide track 28 adjacent the first open lateral end 20 and function in the same manner as the second stop.

As should be appreciated, the apparatus 10 is useful in a new and improved method of shielding an occupant O of a motor vehicle from sunlight L passing through a first side window 12 on a first side of the motor vehicle 16 or a second side window 14 on a second side of the motor vehicle. That method may be broadly described as including the steps of displacing the shade 24 along the guideway 18 in a first direction (note action arrow A in FIG. 2) to at least partially cover the first side window 12 and displacing the shade in a second direction along the guideway (note action arrow B in FIG. 3) to at least partially cover the second side window 14. Still further, the method may include the step of stowing the shade 24 along the guideway 18 between the first side window 12 and the second side window 14 as illustrated in FIG. 1.

Figure 4:
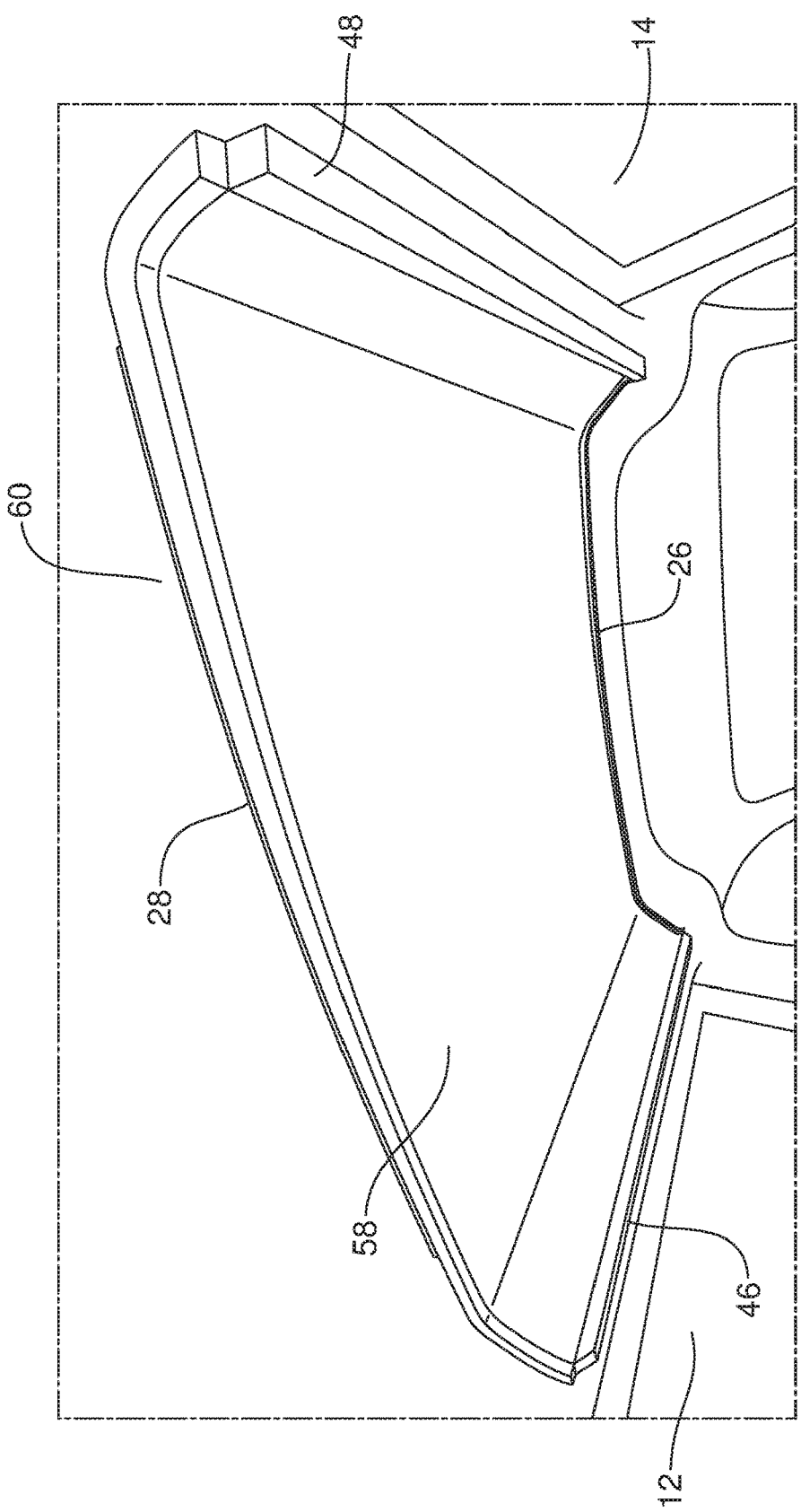
FIG. 4 is a detailed perspective view of the apparatus secured along the headliner of the motor vehicle and showing the shade in the intermediate stowed position.

As shown in detail in FIG. 4, when the shade 24 is in the intermediate, stowed position, the shade may be fully concealed within an attractive housing 58 extending along the headliner 60 of the motor vehicle. In this position, the first handle or fingerhold 46 and the second handle or fingerhold 48 are located between the tops of the first side window 12 and the second side window 14 so that those side windows remain fully uncovered while the fingerholds are conveniently located for easy access when an occupant on either side of the motor vehicle 16 wishes to deploy the shade 24 into either the first use position or the second use position as desired to shield the occupant O from sunlight, coming through either the first side window 12 or the second side window 14 as illustrated in FIGS. 2 and 3.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
    a guideway including a first open lateral end, a second open lateral end, a first guide track and a second guide track; and
    a shade displaceable along said guideway between a first use position projecting from said first open lateral end, a second use position projecting from said second open lateral end and an intermediate stowed position wherein said shade includes a first margin engaged in said first guide track and a second margin engaged in said second guide track.

2. The apparatus of claim 1, further including a first bearing assembly in said first guide track and a second bearing assembly in said second guide track.

3. The apparatus of claim 2, including a first retention feature retaining said first margin in said first guide track.

4. The apparatus of claim 3, including a second retention feature retaining said second margin in said second guide track.

5. The apparatus of claim 4, wherein said first retention feature includes first opposed ribs on said first guide track received in first opposed receivers on said first margin of said shade.

6. The apparatus of claim 5, wherein said second retention feature includes second opposed ribs on said second guide track received in second opposed receivers on said second margin of said shade.

7. The apparatus of claim 6, including a first fingerhold at a first side end of said shade and a second fingerhold at a second side end of said shade.

8. The apparatus of claim 7, including a first stop carried on said first guide track adjacent said second open lateral end.

9. The apparatus of claim 8, including a second stop carried on said first guide track adjacent said first open lateral end.

10. The apparatus of claim 1, including a first fingerhold at a first side end of said shade and a second fingerhold at a second side end of said shade.

11. The apparatus of claim 1, including a first stop carried on said first guide track adjacent said second open lateral end.

12. The apparatus of claim 11, including a second stop carried on said first guide track adjacent said first open lateral end.

13. A method of shielding an occupant of a motor vehicle from sunlight passing through a first side window and a second side window, comprising:
    providing a single shade that is deployable (a) in a first direction to at least partially cover the first side window and (b) in a second direction to at least partially cover the second side window.

14. An apparatus, comprising:
    a guideway including a first open lateral end, a second open lateral end, a first guide track and a second guide track;
    a shade displaceable along said guideway between a first use position projecting from said first open lateral end, a second use position projecting from said second open lateral end and an intermediate stowed position; and
    a first stop carried on said first guide track adjacent said second open lateral end.

15. The apparatus of claim 14, including a second stop carried on said first guide track adjacent said first open lateral end.

* * * * *